(12) United States Patent
Ham et al.

(10) Patent No.: US 12,556,497 B2
(45) Date of Patent: Feb. 17, 2026

(54) SERVER AND METHOD FOR CONTROLLING SAME

(71) Applicant: SAMSUNG ELECTRONICS CO., LTD., Suwon-si (KR)

(72) Inventors: Jina Ham, Suwon-si (KR); Jaewon Kim, Suwon-si (KR); Yewon Park, Suwon-si (KR); Dongil Yang, Suwon-si (KR); Jiyeon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/629,514

(22) Filed: Apr. 8, 2024

(65) Prior Publication Data
US 2024/0259333 A1 Aug. 1, 2024

Related U.S. Application Data

(63) Continuation of application No. PCT/KR2022/012531, filed on Aug. 22, 2022.

(30) Foreign Application Priority Data

Oct. 8, 2021 (KR) ........................ 10-2021-0134035

(51) Int. Cl.
*H04L 51/02* (2022.01)
*G06F 3/0482* (2013.01)
*H04L 51/04* (2022.01)

(52) U.S. Cl.
CPC ............ *H04L 51/02* (2013.01); *G06F 3/0482* (2013.01); *H04L 51/04* (2013.01)

(58) Field of Classification Search
None
See application file for complete search history.

(56) References Cited

U.S. PATENT DOCUMENTS

| | | |
|---|---|---|
| 8,560,301 B2 | 10/2013 | Kim |
| 10,997,372 B2 | 5/2021 | Gupta et al. |

(Continued)

FOREIGN PATENT DOCUMENTS

| | | |
|---|---|---|
| JP | 6721923 B1 | 7/2020 |
| KR | 10-0526778 B1 | 11/2005 |

(Continued)

OTHER PUBLICATIONS

Koundinya et al., "Smart College Chatbot using ML and Python", Jul. 3, 2020, IEEE, 2020 International Conference on System, Computation, Automation and Networking (ICSCAN) (2020, pp. 1-5) (Year: 2020).*

(Continued)

*Primary Examiner* — Davoud A Zand
(74) *Attorney, Agent, or Firm* — Sughrue Mion, PLLC

(57) ABSTRACT

A server and a control method thereof are provided. The method for controlling the server includes obtaining information of an activity of a user using a service system, determining a user intent based on the information on the activity of the user, transmitting a question text to a chatbot system by obtaining the question text corresponding to the user intent based on the user intent, receiving a first response text to the question text from the chatbot system, determining whether to transmit the first response text to a user terminal of the user based on the first response text, and transmitting the first response text to the user terminal.

18 Claims, 10 Drawing Sheets

(56) References Cited

U.S. PATENT DOCUMENTS

| | | | |
|---|---|---|---|
| 2012/0075178 A1 | 3/2012 | Cho et al. | |
| 2016/0275582 A1* | 9/2016 | Zuverink | G06F 3/04842 |
| 2020/0005118 A1* | 1/2020 | Chen | G06F 16/3329 |
| 2020/0007380 A1* | 1/2020 | Chen | H04L 51/02 |
| 2020/0192978 A1* | 6/2020 | Sivagnanam | G06F 40/284 |
| 2020/0218995 A1 | 7/2020 | Neogi et al. | |
| 2021/0081442 A1 | 3/2021 | Ganu et al. | |
| 2022/0156298 A1* | 5/2022 | Mahmoud | G06F 16/9535 |
| 2022/0191154 A1* | 6/2022 | Truong | H04L 51/02 |

FOREIGN PATENT DOCUMENTS

| | | |
|---|---|---|
| KR | 10-2008-0104212 A | 12/2008 |
| KR | 10-1009638 B1 | 1/2011 |
| KR | 10-2012-0031722 A | 4/2012 |
| KR | 10-1577607 B1 | 12/2015 |
| KR | 10-2018-0128805 A | 12/2018 |
| KR | 10-2019-0116044 A | 10/2019 |
| KR | 10-2087287 B1 | 3/2020 |
| KR | 10-2020-0104544 A | 9/2020 |
| KR | 10-2169397 B1 | 10/2020 |

OTHER PUBLICATIONS

Meshram et al., "Conversational AI: Chatbots", Jun. 25, 2021, IEEE, 2021 International Conference on Intelligent Technologies (CONIT) (2021, pp. 1-6) (Year: 2021).*

International Search Report (PCT/ISA/210) issued Dec. 7, 2022 by the International Searching Authority in International Patent Application No. PCT/KR2022/012531.

Written Opinion (PCT/ISA/237) issued Dec. 7, 2022 by the International Searching Authority in International Patent Application No. PCT/KR2022/012531.

Communication issued Dec. 3, 2024 by the European Patent Office in European patent Application No. 22878715.6.

Feine, Jasper et al., "A Chatbot Response Generation System", MuC'20, Sep. 6-9, 2020, Magdeburg, Germany, pp. 333-341, XP058877912. (9 pages total).

* cited by examiner

SERVER AND METHOD FOR CONTROLLING SAME

CROSS REFERENCE TO RELATED APPLICATIONS

This is a continuation application of PCT/KR2022/012531 filed Aug. 22, 2022 and claims priority to KR 10-2021-0134035 filed on Oct. 8, 2021 in the Korean Intellectual Property Office. The contents of the above applications are hereby incorporated by reference.

FIELD

The disclosure relates to a server and a control method thereof. More particularly, the disclosure relates to a server which manages dialog between a user and a chatbot system by relaying between a service system and the chatbot system and controls action within the service system and a control method thereof.

BACKGROUND

Recent service systems (e.g., web page, application, device, etc.) provide a chatbot service which provides an action or response desired by a user using the chatbot system to perform an action desired by the user more quickly. At this time, the chatbot service provided from the service system may be provided from the service system and a chatbot system which is a separate system from the service system.

Accordingly, while the service system provides various services, there may be the inconvenience of the user having to search the action intended to be performed directly taking into reference an answer (natural language or image, link, etc.) of a chatbot provided from a separate chatbot system, and there may be the inconvenience of having to input each question on an action or content desired by the user because there is no connection between the action performed in the service system and a chatbot dialog.

Technical Problem

Aspects of the disclosure are to address at least the above-mentioned problems and an aspect of the disclosure is to provide a server which generates a question text by determining a user intent based on an activity of the user using a service system, and performs dialog with a chatbot by obtaining a response text by providing the question text to a chatbot service and a control method thereof.

In addition, there is a problem that the amount of resources consumed to provide answer corresponding to user's intent is increased, such as providing information for the user having to search the action to be performed.

Technical Solution

Provided herein is a method for controlling a server, the method comprising: obtaining an activity information on an activity of a user, wherein the user is using a service system; determining a user intent based on the activity information; obtaining a question text corresponding to the user intent based on the user intent; transmitting the question text to a chatbot system; receiving, from the chatbot system in response to the question text, a first response text; determining, based on the first response text, whether to transmit the first response text to a user terminal of the user; and transmitting the first response text to the user terminal based on the determining.

Also provided herein is a server, comprising: a communication interface; a memory comprising at least one instruction; and a processor configured to control the server by being connected with the communication interface and the memory, wherein the processor is further configured to: obtain, by executing the at least one instruction, activity information of an activity of a user using a service system, determine a user intent based on the activity information, control the communication interface to transmit a question text to a chatbot system by obtaining the question text corresponding to the user intent based on the user intent, receive a first response text to the question text from the chatbot system through the communication interface, determine whether to transmit the first response text to a user terminal of the user based on the first response text, and transmit the first response text to the user terminal based on the determination.

According to various embodiments of the disclosure as described above, a dialog may be performed with a chatbot system consistent with a user intent, and a service system may be able to actively provide an action desired by a user.

According to various embodiments of the disclosure as described above, amount of resources required to provide answer corresponding to user's intent is decreased by determining the user's intent based on the user's activity, generating a question text, and providing the question text to a chatbot service to obtain a response text.

Figure 1:
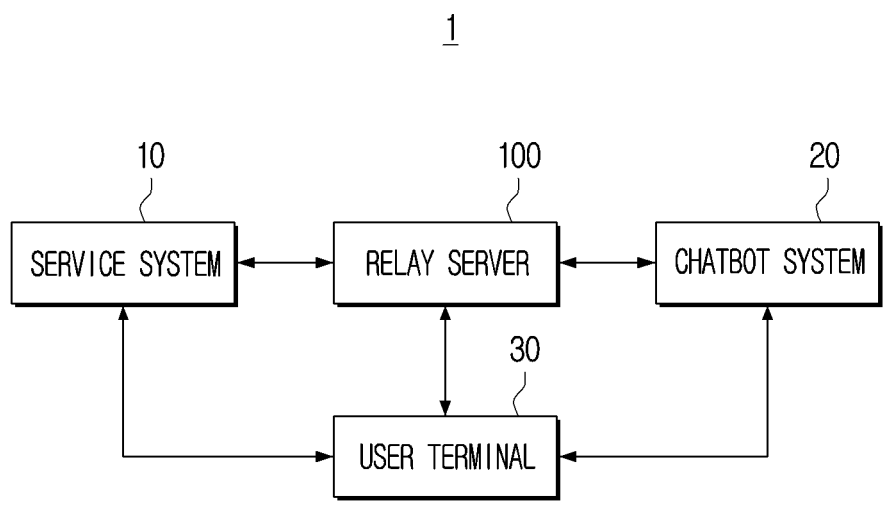
FIG. 1 is a diagram illustrating a system capable of performing an action of a service system through a chatbot system according to an embodiment.

Various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. With respect to the description on the drawings, like reference numerals may be used to indicate like elements.

In describing the disclosure, in case it is determined that the detailed description of related known technologies may unnecessarily confuse the gist of the disclosure, the detailed description thereof will be omitted.

Further, the embodiments below may be modified to various different forms, and it is to be understood that the scope of the technical spirit of the disclosure is not limited to the embodiments below. Rather, the embodiments are provided so that the disclosure will be thorough and complete, and to fully convey the technical spirit of the disclosure to those skilled in the art.

Terms used herein have merely been used to describe a specific embodiment, and it is not intended to limit the scope of protection. A singular expression includes a plural expression, unless otherwise specified.

In the disclosure, expressions such as "comprise," "may comprise," "include," "may include," or the like are used to designate a presence of a corresponding characteristic (e.g., elements such as numerical value, function, operation, or component, etc.), and not to preclude a presence or a possibility of additional characteristics.

In the disclosure, expressions such as "A or B," "at least one of A and/or B," or "one or more of A and/or B" may include all possible combinations of the items listed together. For example, "A or B," "at least one of A and B," or "at least one of A or B" may refer to all cases including (1) at least one A, (2) at least one B, or (3) both of at least one A and at least one B.

Expressions such as "first," "second," "1st," "2nd," or so on used herein may be used to refer to various elements regardless of order and/or importance, and it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to another element or as being coupled through other element (e.g., third element).

On the other hand, when a certain element (e.g., first element) is indicated as "directly coupled with/to" or "directly connected to" another element (e.g., second element), it may be understood as the other element (e.g., third element) not being present between the certain element and another element.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware.

Rather, in a certain circumstance, the expression "a device configured to . . . " may mean something that the device "may perform . . . " together with another device or components. For example, the phrase "a processor configured to (or set up to) perform A, B, or C" may mean a dedicated processor for performing a corresponding operation (e.g., embedded processor), or a generic-purpose processor (e.g., a central processing unit (CPU) or an application processor) capable of performing the corresponding operations by executing one or more software programs stored in the memory device.

The terms 'module' or 'part' used in the embodiments herein perform at least one function or operation, and may be implemented with a hardware or software, or a combination of hardware and software. Further, a plurality of 'modules' or a plurality of 'parts,' except for a 'module' or a 'part' which needs to be implemented to a specific hardware, may be integrated to at least one module and implemented in at least one processor.

In an embodiment, a 'text' may mean a sentence, but this is merely one embodiment, and may include a phrase, a word, a syllable, and the like.

The various elements and areas of the drawings have been schematically illustrated. Accordingly, the technical idea of the disclosure is not limited by relative sizes and distances illustrated in the accompanied drawings.

Embodiments of the disclosure will be described in detail below with reference to the accompanying drawings to aid in the understanding of those of ordinary skill in the art.

FIG. 1 is a diagram illustrating a system capable of performing an action of a service system through a chatbot system according to an embodiment. The system 1 may include a service system 10, a chatbot system 20, a user terminal 30, and a relay server 40. However, this is merely one embodiment, and another server may be added in addition to the configuration described above.

The service system 10 may perform various actions according to a type of service provided by the service system 10. At this time, the service system may be a device providing a web page service, an application service, or a device service, but this is merely one embodiment, and may be implemented as a device providing other services. Specifically, based on the service system 10 being a device providing the web page service or the application service, the service system 10 may be implemented in at least one server, and based on the service system 10 being a device providing the application service or the device service, the service system 10 may be implemented as the terminal device.

The service system 10 may collect information on an activity of a user using (or, accessing) the service system 10. The collected information may be referred to as activity information. At this time, information on the activity of the user may include at least one from among information on a screen currently provided by the service system 10 ("screen information"), information on an item clicked by the user ("click information"), information on content input by the user ("content information"), and information on time displayed in the screen provided by the service system 10 ("time information"), but is not limited thereto.

In addition, the service system 10 may perform an action provided by the service system according to an instruction received from a relay server 100.

The chatbot system 20 may be a configuration configured to perform a dialog with the user using the service system 10, and may be implemented as at least one server. Specifically, the chatbot system 20 may transmit a response text on a question text received from the relay server 100 or the user terminal 30 to the relay server 100.

In addition, the chatbot system 20 may include a response content database (DB) which includes content associated with the service system 10 so as to perform a dialog associated with the service system 10.

The user terminal 30 may provide, as a terminal device corresponding to the user using the service system 10, a result (e.g., web page screen, etc.) of the action provided by the service system. In addition, the user terminal 30 may display a chat window screen for dialoging with the chatbot system 20 through the display. The chat window screen may display the question text input by the user and the response text responded by the chatbot system 20. However, the chat window screen may not display at least a part of the question text provided to the chatbot system by the relay server 100.

The relay server 100 may manage a dialog of the user and the chatbot system by relaying the service system 10 and the chatbot system 20 and control an action of the service system.

Specifically, the relay server 100 may determine a user intent by obtaining information on the activity of the user using the service system 10, and provide the question text to the chatbot system 20 by obtaining the question text corresponding to the user intent based on the user intent. Further, the relay server 100 may receive a first response text to the question text from the chatbot system 20, identify whether to transmit to the user terminal of the user by determining whether the first response text is a normal response to the question text based on the first response text, and transmit the first response text to the user terminal 30 based on the identification. This may also be referred to as determining, based on the first response text, whether to transmit.

In addition, the relay server 100 may receive a second response text from the chatbot system 20, extract an action text on an action performable by the service system 10 from the second response text, obtain information on an action list provided in the current screen by the service system 10, identify an action corresponding to the second response text based on information on the extracted action text and the action list, and control an action of the service system 10 by transmitting an instruction on the identified action to the service system 10.

Figure 2:
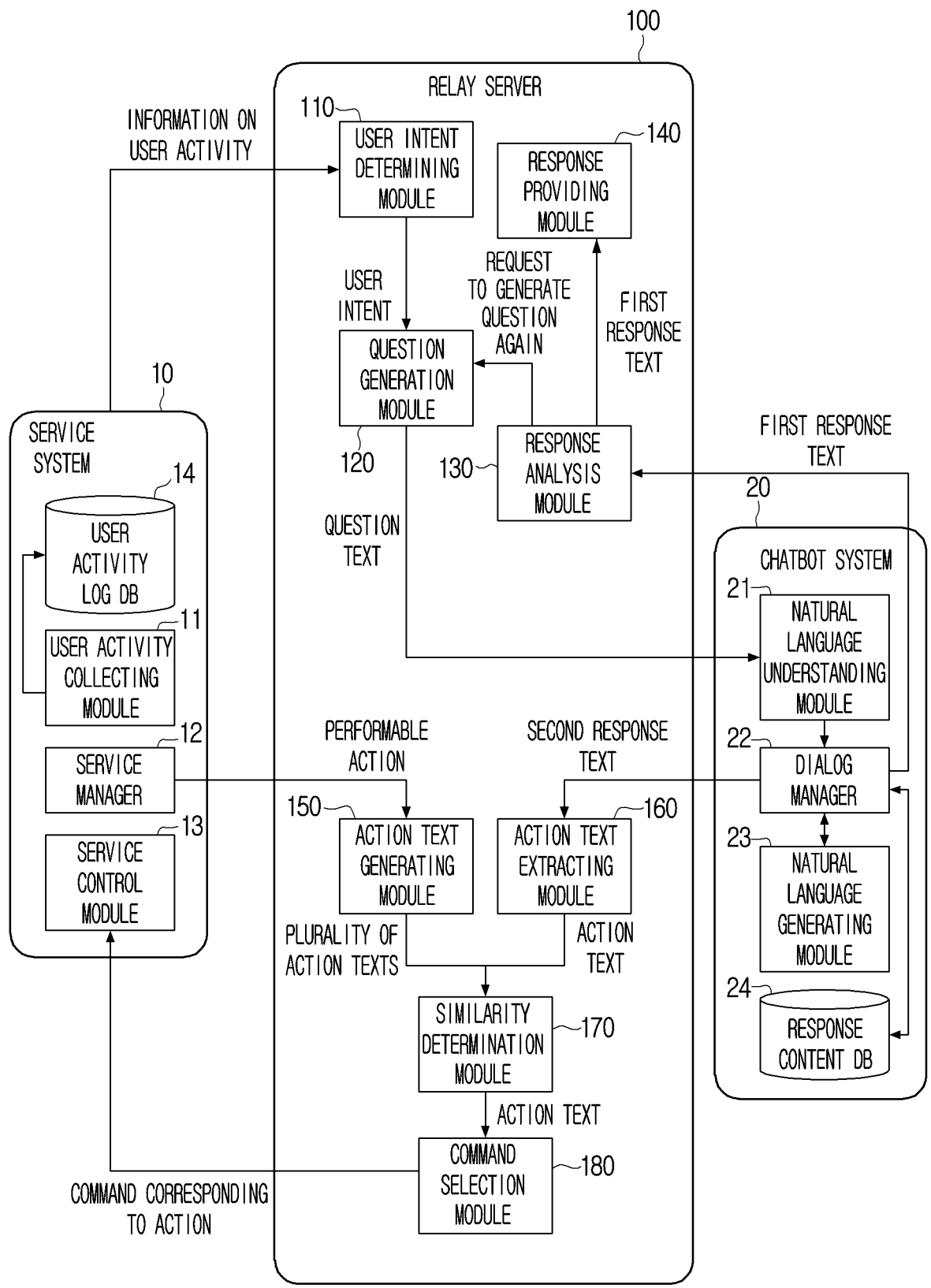
FIG. 2 is a block diagram illustrating a configuration included in a service system, a chatbot system, and a relay server according to an embodiment.

FIG. 2 is a block diagram illustrating a configuration included in the service system 10, the chatbot system 20, and the relay server 100 according to an embodiment. As illustrated in FIG. 2, the service system 10 may include a user activity collecting module 11, a service manager 12, a service control module 13, and a user activity log DB 14. The chatbot system 20 may include a natural language understanding module 21, a dialog manager 22, a natural language generating module 23, and a response content DB 24. In addition, the relay server 100 may include intent of the user determining module 110, a question generation module 120, a response analysis module 130, a response providing module 140, an action text generating module 150, an action text extracting module 160, a similarity determination module 170, and a command selection module 180. However, the configuration illustrated in FIG. 2 is merely one embodiment, and another configuration may be added or some configurations may be deleted.

The user activity collecting module 11 may collect information on the activity of the user using the service system 10. For example, based on the service system 10 being a service system which provides the web page service, the user activity collecting module 11 may include at least one from among information on the web page screen, information on the item clicked by the user in the web page, information on the content input by the user in the web page, and information on time the user spent from the web page screen. In another example, based on the service system 10 being a service system which provides the application service, the user activity collecting module 11 may include at least one from among information on the application screen, information on the item clicked by the user from an application, information on content input by the user in the application, and information on time the user spent in at least one screen included in the application.

The user activity collecting module 11 may store information on a collected user activity in the user activity log DB 14. The user activity log DB 14 may identify a user based on a user identification information (e.g., user IP, user ID, etc.), and store information on the collected user activity based on the identified user.

In FIG. 2, the user activity log DB 14 has been described as included in the service system 10, but this is merely one embodiment, and may be implemented separately in another server.

In order to analyze an action intended to be performed by the user or potential needs, the user intent determining module 110 may determine the user intent based on information on the activity of the user stored in the user activity log DB 14. This may be referred to as determining a user intent based on activity information. For example, based on a same page in a shopping web page being repeatedly browsed by a threshold number of times or the time spent exceeding a threshold time, the user intent determining module 110 may determine a purchase intent of a product sold from the corresponding page. In another example, based on a number of clicks of an item ("click information") of a specific category (e.g., one-piece) from among a plurality of items included in the shopping web page being greater than or equal to a threshold number of times or a number of products of the specific category placed in a shopping cart being greater than or equal to a threshold number of times, the user intent determining module 110 may determine an intent of comparison purchase of a product of the specific category (one-piece). In another example, based on information on the activity of the user of clicking an event item being obtained, the user intent determining module 110 may receive information on the event item and determine participation intent. In another example, based on a number of searches on a specific route in a plane ticket reservation application being greater than or equal to a threshold value, the user intent determining module 110 may determine the purchase intent of a plane ticket of a specific route.

In addition, the user intent determining module 110 may obtain information on the user intent by inputting obtained information on the activity of the user to a trained neural network model (e.g., user intent learning model, etc.). That is, the user intent determining module 110 may obtain information on the activity of the user (e.g., information on the item clicked in the web page and number of clicks, time spent in the web page screen, etc.) as input data for inputting to the neural network model, and obtain information on the user intent (e.g., intent for comparison purchase of a product included in a specific category, intent of reserving a plane ticket of a specific route, intent of participating in a lunar new year event, etc.) as output data by inputting the obtained information on the activity of the user to a neural network model. At this time, the trained neural network model may be trained based on the type of service and action provided by the service system 10.

Based on not being able to determine the user intent based on information on the activity of the user, the user intent determining module 110 may determine the user intent corresponding to the user activity by additionally collecting information on the activity of the user.

The information on user intent obtained by the user intent determining module 110 may include information on a user act (e.g., purchasing act, reserving act, etc.) in addition to information on a target of the user act (e.g., information on a product, information on a specific route, etc.).

The user intent determining module 110 in the above-described embodiment has been described as receiving information on the activity of the user from the service system 10, but this is merely one embodiment, and may receive from the user terminal 30 directly.

The question generation module 120 may generate the question text based on the user intent obtained by the user intent determining module 110. This may be referred to as, for example, obtaining a question text corresponding to the user intent based on the user intent. At this time, the question generation module 120 may obtain the question text corresponding to the user intent by inputting information on user intent obtained by the user intent determining module 110 to the trained neural network model (question generation model). The output data output by the trained neural network model may be the question text of a natural language form.

The question text generated by the question generation module 120 may not be transmitted to the user terminal 20, and transmitted directly to the chatbot system 20.

The natural language understanding module 21 may perform natural language understanding of the obtained question. Specifically, the natural language understanding module 21 may identify a domain and an intent of the question text by performing a syntactic analysis or a semantic analysis based on the question text. At this time, the syntactic analysis may divide the user input into syntactic units (e.g., words, phrases, morphemes, etc.), and identify which divided unit has which syntactic element. The semantic analysis may be performed by using sematic matching, rule matching, formula matching, and the like. Specifically, the natural language understanding module 21 may obtain a natural language understanding result, a category of the question text, the intent of the question text, and a slot (or, entity, parameter, etc.) for performing the intent of the question text.

The dialog manager 22 may obtain the response text to the question text based on the intent of the question text and the slot obtained in the natural language understanding module 21. At this time, the dialog manager 22 may obtain the response text to the question text based on the response content DB 24. The response content DB 24 may be included in the chatbot system 20, but this is merely one embodiment, and may be included in an external server. In addition, the response content DB 24 may store the response content according to a feature of the service system 10. For example, based on the service system 10 being a clothing purchase website, the response content DB 24 may store the response content associated with purchasing clothing. In addition, the dialog manager 22 may determine whether the intent of the question text identified by the natural language understanding module 21 is clear. For example, the dialog manager 22 may determine whether the intent of the question text is clear based on whether information on the slot is sufficient. In addition, the dialog manager 22 may determine whether the slot identified in the natural language understanding module 21 is sufficient in performing a task. According to an embodiment, a dialog manager module 22 may provide the response text including a response rejection when the intent of the question text is not clear.

The dialog manager 22 may obtain the first response text to the question text and transmit to the response analysis module 130.

In FIG. 2, the response content DB 24 has been described as included in the chatbot system 20, but this is merely one embodiment, and may be implemented separately in another server.

The response analysis module 130 may identify whether to transmit the first response text to the user terminal of the user by analyzing whether the first response text is a normal response. According to an embodiment, the response analysis module 130 may identify whether it is a normal response by identifying whether information on the response rejection is included in the first response text. Specifically, based on information on the response rejection not being included in the first response text, the response analysis module 130 may determine that the first response text is a normal response, and based on information on the response rejection being included in the first response text, the response analysis module 130 may determine that the first response text is an abnormal response. In another embodiment, the response analysis module 130 may obtain information (e.g., probability value) on whether the first response text is a response to the question text by inputting the question text and the first response text to the trained neural network model (e.g., question-response determining model).

When determined as a normal answer, the response analysis module 130 may provide the obtained first response text to the response providing module 140. At this time, the response providing module 140 may transmit the obtained information on the first response text to the user terminal 30. The user terminal 30 may display the first response text on the chat window screen provided by the service system 10.

When determined as an abnormal answer, the response analysis module 130 may output a request to generate the question again (or re-question) to the question generation module 120. In an example, the question generation module 120 may generate a new question text based on the user intent determined at the time point at which the request to generate the question again is received and not the user intent previously determined. In another example, the response analysis module 130 may identify the number of times determined as an abnormal answer. Based on being identified as an abnormal answer of less than a threshold number of times, the response analysis module 130 may transmit the request to generate the question again to the question generation module 120, and the question generation module 120 may generate the question text again based on the previously determined user intent. When identified as an abnormal answer of greater than or equal to a threshold number of times, the response analysis module 130 may not request to generate the question again, and may transmit a request to the user intent determining module 110 so as to determine a new user intent.

The service manager 12 may manage information on an action provided by the service system 10. In addition, the service manager 12 may transmit information on a currently performable action by the service system 10 to the relay server 100.

The text generating module 150 may obtain information on the currently performable action by the service system 10. The information on the currently performable action by the service system 10 may be information on an action list selectable by the user in the screen currently provided by the service system 10. As an example, based on the service system 10 being a service system which provides the web page service, information on the currently performable action by the service system 10 may be information on an item selectable in the web page screen currently displayed.

The text generating module 150 may obtain a plurality of action texts corresponding to a plurality of actions by inputting each information on the plurality of actions included in the action list to the trained neural network model (e.g., action text generating model). At this time, the action text may be in a natural language form.

In addition, while the user and the chatbot system 20 perform a dialog associated with the service system 10, the dialog manager 22 may provide the second response text to the relay server 100.

The action text extracting module 160 may extract the action text in the second response text. At this time, the action text may be a text associated with the action provided by the service system 10, and may be in the natural language form. Specifically, the action text extracting module 160 may extract the action text included in the second response text by inputting the second response text to the trained neural network model (e.g., action text extracting model).

The similarity determination module 170 may determine a similarity between the plurality of action texts generated from the action text generating module 150 and the action text extracted from the action text extracting module 160. At this time, the similarity determination module 170 may obtain similarity by inputting the plurality of action texts and the extracted action text to the trained neural network model (e.g., similarity determination model). Further, the similarity determination module 170 may obtain the action text of which the similarity with the extracted action text from among the plurality of action texts is greater than or equal to a threshold value.

The command selection module 180 may identify the action corresponding to the second response text based on the action text obtained through the similarity determination module 170, and select a command for the identified action. Then, the command selection module 180 may transmit the command corresponding to the obtained action to the service control module 13. For example, embodiments include transmitting the command to the service control module 13 of the service system.

The service control module 13 may perform the action provided by the service system 10 based on the command obtained from the command selection module 180. In addition, the service control module 13 may perform the action provided by the service system 10 according to a control command received from the user terminal 30.

Figure 3:
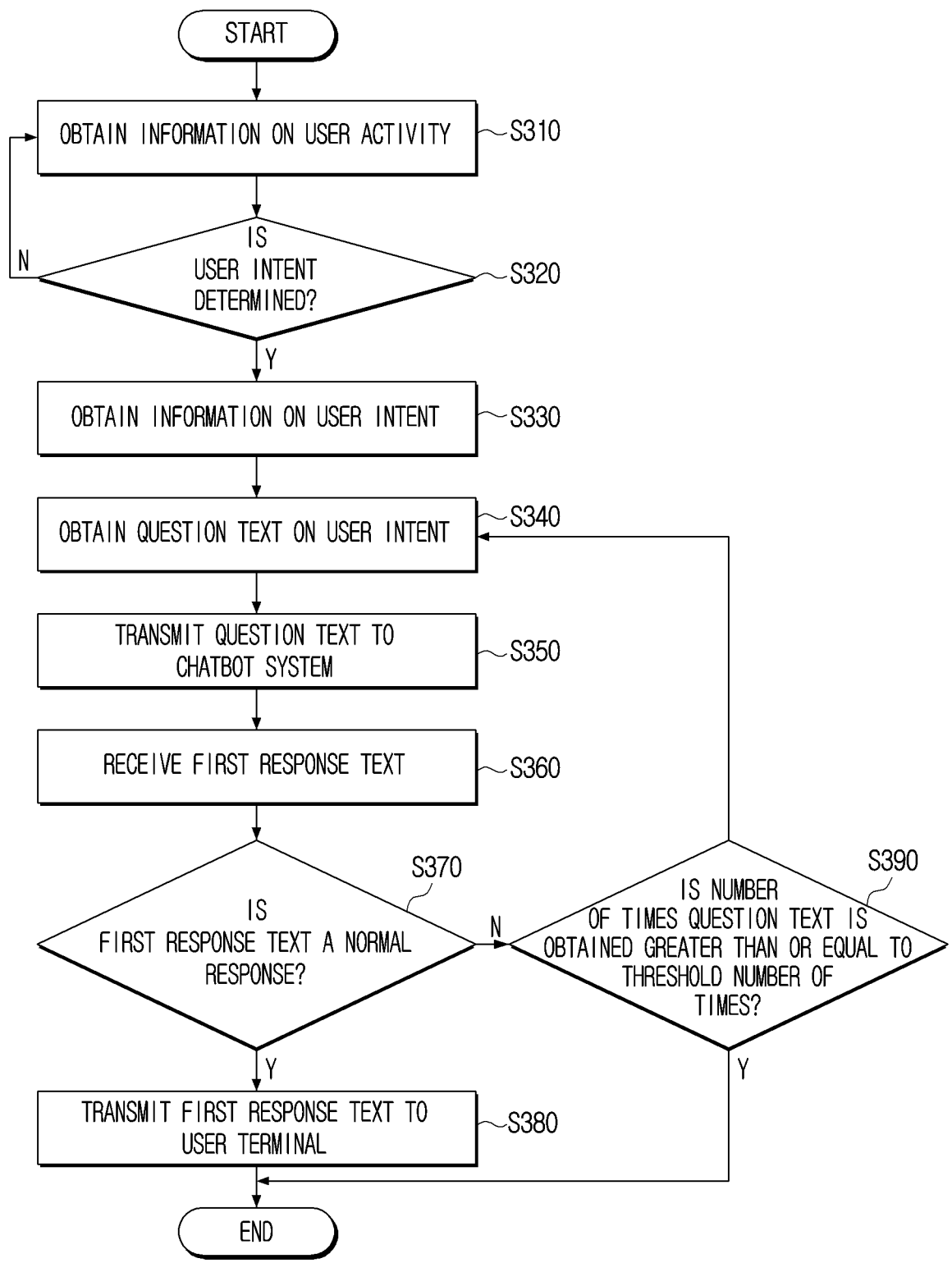
FIG. 3 is a flowchart illustrating a method of performing a dialog with a chatbot system by obtaining a question text corresponding to a user intent by a server according to an embodiment.

FIG. 3 is a flowchart illustrating a method of performing a dialog with a chatbot system by obtaining a question text corresponding to a user intent by a server according to an embodiment. Embodiments provided herein may be performed, at least in part, by the relay server 100.

First, the relay server 100 may obtain information on the activity of the user (S310). This may be referred to as activity information. At this time, the information on the activity of the user may include at least one from among information on the currently displayed service screen ("screen information"), information on the item clicked by the user, information on the content input by the user ("content information"), and information on time of which the service screen is displayed ("time information").

The relay server 100 may determine whether the user intent is determined based on the information on the activity of the user (S320).

When the user intent is determined (S320-Y), the relay server 100 may obtain the information on user intent (S330). When the user intent is not determined (S320-N), the relay server 100 may determine again whether the user intent is present by additionally obtaining the information on the activity of the user.

The relay server 100 may obtain the question text on the user intent (S340). At this time, the relay server 100 may obtain the question text in the natural language form by inputting the information on user intent to the trained neural network model. The question text may be a virtual question text not provided to the user terminal 30.

The relay server 100 may transmit the question text to the chatbot system 20 (S350). For example, the question text may be provided to a natural language understanding module of the chatbot system. The chatbot system 20 may perform the natural language understanding of the question text through the existing natural language understanding module 21 and the dialog manager 22 and obtain the first response text to the question text.

The relay server 100 may obtain the first response text from the chatbot system 20 (S360). In an example, the first response text is received from the dialog manager of the chatbot system.

Figure 4A:
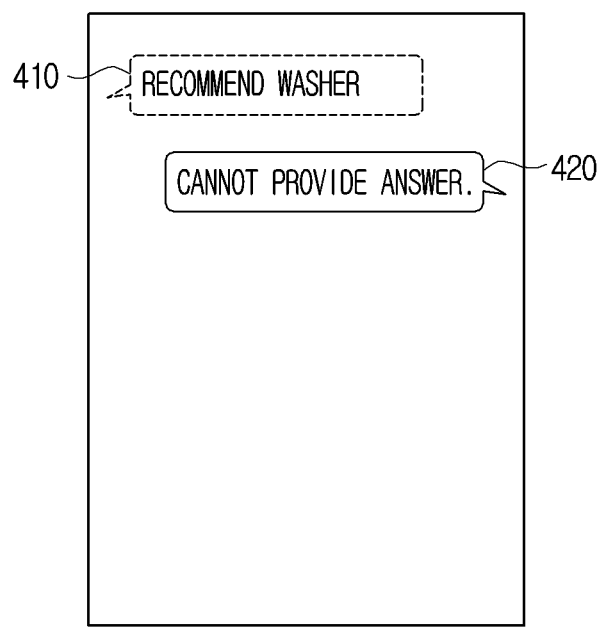
FIGS. 4A and 4B are diagrams illustrating a method of determining whether a first response text on a question text is a normal response according to an embodiment.
Figure 4B:
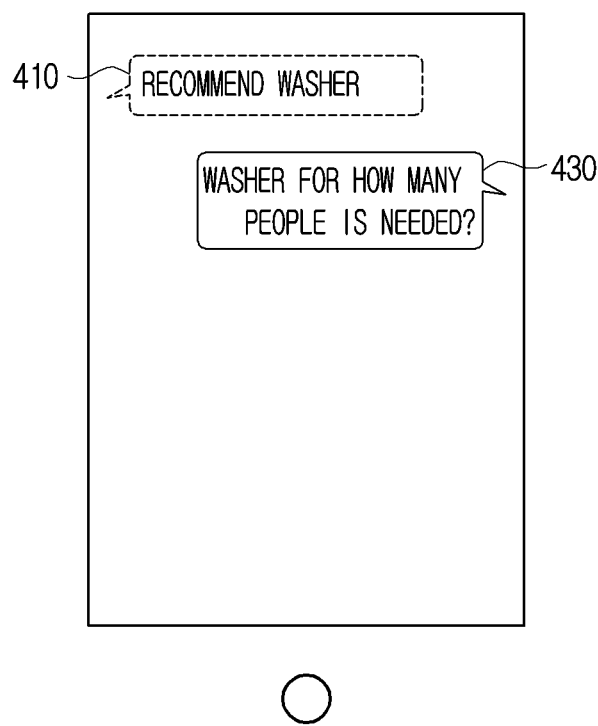

The relay server 100 may determine whether the obtained first response text is a normal response (S370). In an embodiment, the relay server 100 may determine whether it is a normal response by identifying whether information on the response rejection is included in the first response text. For example, as illustrated in FIG. 4A, based on "no answer can be provided" 420 being obtained as the first response text to the question text of "recommend a washer" 410, the relay server 100 may determine the first response text as an abnormal answer because the information on the response rejection is included in the obtained first response text. However, as illustrated in FIG. 4B, based on "a washer for how many people is needed?" 430 being obtained as the first response text to the question text of "recommend a washer" 410, the relay server 100 may determine the first response text as a normal answer because information on the response rejection is not included in the obtained first response text. In another embodiment, the relay server 100 may determine whether it is a normal response by determining whether the first response text is a response to the question text by inputting the question text and the first response text to the trained neural network model. That is, the relay server 100 may identify whether to transmit the first response text to the user terminal 30 by identifying whether the first response text is a normal response.

When determined as a normal response (S370-Y), the relay server 100 may transmit the first response text to the user terminal 30 (S380). At this time, the user terminal 30 may display only the first response text and not the question text in the chat window screen with the chatbot system 20.

When determined as an abnormal response (S370-N), the relay server 100 may determine whether the number of question texts obtained is greater than or equal to a threshold number of times (e.g., 3-times) (S390). Based on the number of times the question text is obtained being greater than or equal to a threshold number of times (S390-Y), the relay server 100 may delete the first response text, and end the step, and based on the number of times the question text is obtained being less than a threshold number of times (S390-N), the relay server 100 may obtain the question text on the user intent again (S340).

As described above, the relay server 100 may generate the question text corresponding to the user intent, and by starting a dialog with the chatbot system based on the generated question text, user convenience of using the chatbot system 20 may be increased because the chatbot system 20 may actively start a dialog by identifying the user intent even though the user did not start dialoging with the chatbot system 20 first.

Figure 5:
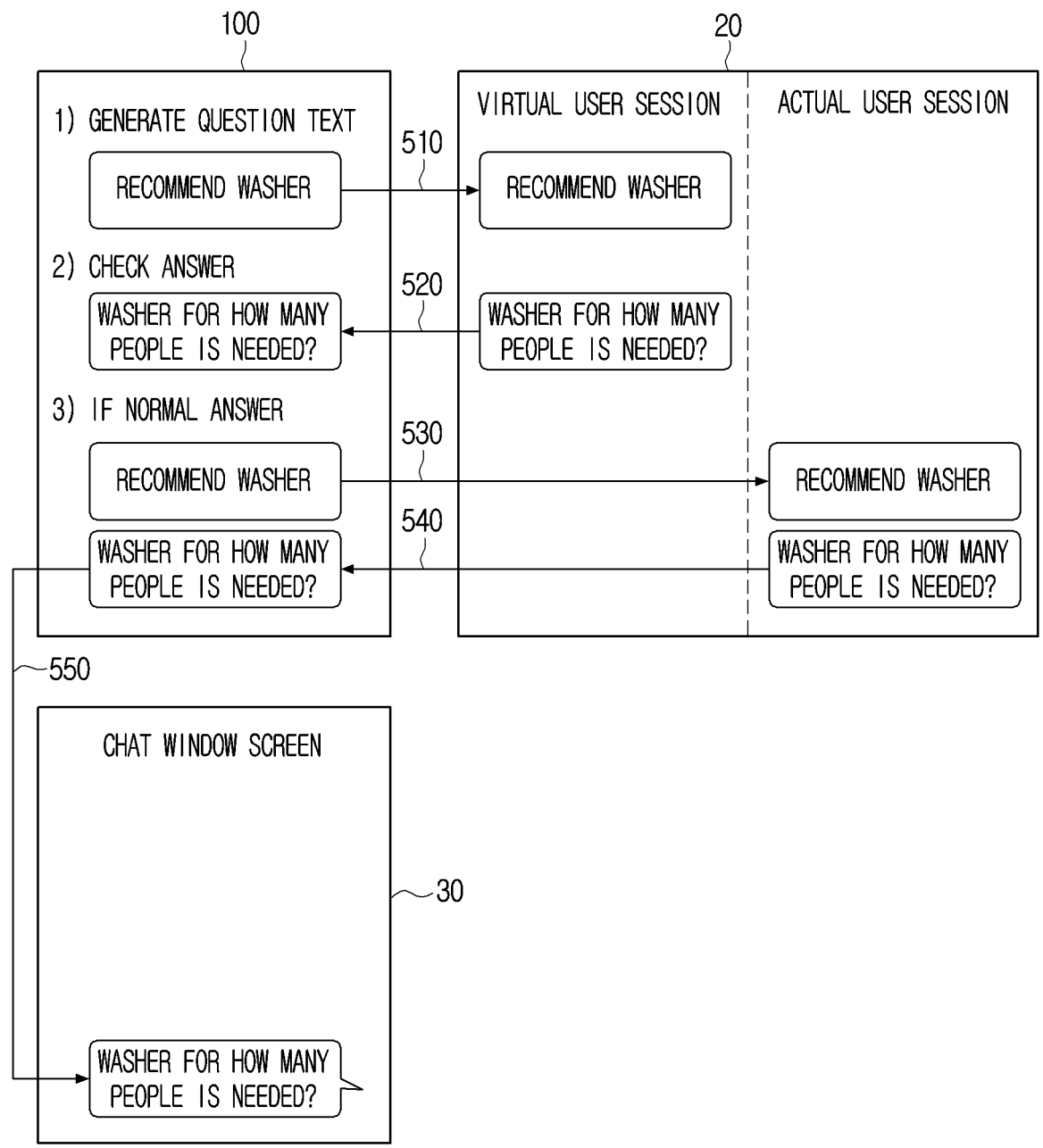
FIG. 5 is a diagram illustrating a process of displaying a first response text in a chat window screen of a user terminal according to an embodiment.

FIG. 5 is a diagram illustrating a process of displaying a first response text in a chat window screen of a user terminal according to an embodiment.

The relay server 100 may generate the question text corresponding to the user intent with the method as described above. For example, the relay server 100 may generate the question text of "recommend a washer" based on the user intent. The relay server 100 may transmit the obtained question text to the chatbot system 20 (510).

At this time, the chatbot system 20 may generate a virtual user session, and register the question text obtained in the virtual user session. Then, the chatbot system 20 may obtain the first response text of "a washer for how many people is needed?" as the response text to the question text, and register the first response text in the virtual user session. Then, the chatbot system 20 may transmit the first response text registered in the virtual user session to the relay server 100 (520).

The relay server 100 may determine whether the obtained first response text is a normal answer. When determined as a normal answer, that is, based on identifying that the first response text is to be transmitted to the user terminal 30, the relay server 100 may re-transmit the question text to the chatbot system 20 (530).

The chatbot system 20 may generate an actual user session, and register the obtained question text in the actual user session. Thus the first response text is registerd in a user session of the chatbot system. Then, the chatbot system 20 may register the first response text again in the actual user session. Then, the chatbot system 20 may transmit the first response text registered in the virtual user session to the relay server 100 (540). At this time, the chatbot system 20 may end the dialog of the virtual user session.

The relay server 100 may transmit the obtained first response text to the user terminal 30 (550). The user terminal 30 may display the obtained first response text on the chat window screen with the chatbot system 20. At this time, as illustrated in FIG. 5, the question text may not be displayed and only the first response text may be displayed in the chat window screen displayed in the user terminal 30. That is, from a standpoint of the user, even if the user does not start the dialog first, the chatbot system 20 may recognize as starting the dialog by first identifying the user intent.

Then, the dialog thereafter between the user and the chatbot system 20 may be registered and managed in the actual user session of the chatbot system 20.

Figure 6:
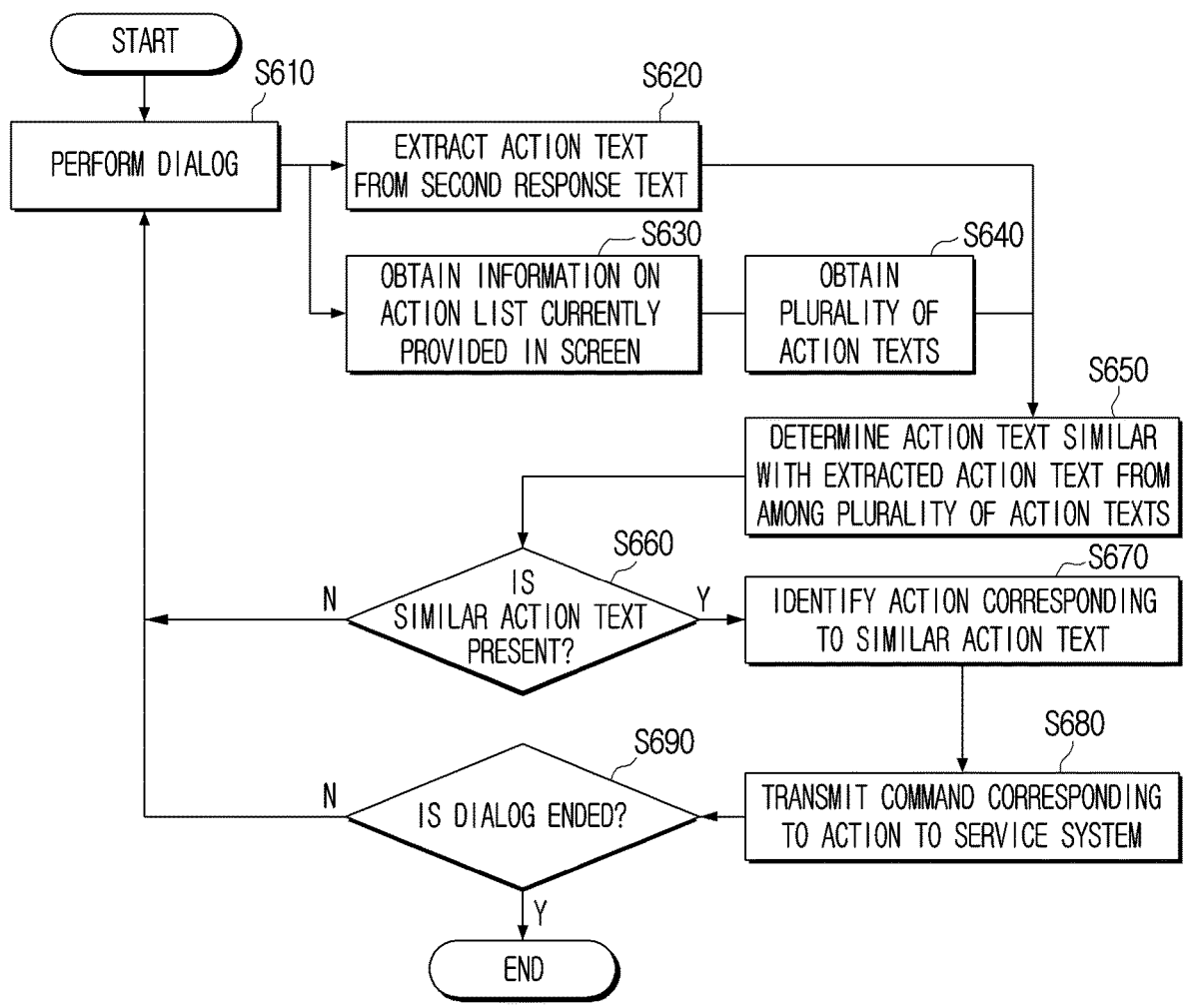
FIG. 6 is a flowchart illustrating a method of performing an action corresponding to a response text by obtaining an action text from the response text according to an embodiment.

FIG. 6 is a flowchart illustrating a method of performing an action corresponding to a response text by obtaining an action text from the response text according to an embodiment.

The chatbot system 20 and the user may perform a dialog (S610). At this time, the chatbot system 20 and the user terminal 30 of the user may perform a dialog through the relay server 100. Specifically, the chatbot system 20 may obtain the second response text to a user question or a virtual question of the relay server 100, and provide the obtained second response text to the relay server 100.

The relay server 100 may extract the action text from the second response text (S620). At this time, the action text may mean a text associated with an action performable by the service system 10 in the second response text. Specifically, the relay server 100 may extract the action text by inputting the second response text to an action text extracting model which is the trained neural network model.

In addition, the relay server 100 may obtain information on the action list provided in the current screen (S630). This may be referred to as "list information." Specifically, the relay server 100 may receive information on the action list (e.g., clickable icons, thumbnails, categories, banners, etc.) provided in the currently displayed screen from the service system 10.

Then, the relay server 100 may obtain the plurality of action texts based on the obtained information on the action list (S640). Specifically, the relay server 100 may obtain the action text corresponding to the respective actions by inputting information on the plurality of actions included in the action list in the trained neural network model (e.g., action text generating model).

Although step S620 and steps S630 and S640 have been described as being performed in parallel in FIG. 6, this is merely one embodiment, and steps S630 and S640 may be performed after step S620 is performed. That is, after the action text is extracted from the second response text, the plurality of action texts may be obtained by obtaining information on the action list provided in the current screen.

The relay server 100 may determine the action text similar with the extracted action text from among the plurality of action texts (S650). Specifically, the relay server 100 may obtain the similarity between the respective action texts and the extracted action text by inputting the respective action texts and the extracted action text in a similarity determination model which is the trained neural network model. For example, this may include determining a plurality of similarities between the plurality of action texts and the first action text.

The relay server 100 may determine whether the action text similar with the extracted action text from among the plurality of action texts is present (S660). Specifically, the relay server 100 may determine whether the similar action text is present by identifying the action text of which the similarity with the extracted action text from among the plurality of action texts is greater than or equal to a threshold value.

Based on determining that the similar action text is not present (S660-N), the chatbot system 20 and the user may perform a dialog through the relay server 100 (S610).

Based on determining that the similar action text is present (S660-Y), the relay server 100 may identify the action corresponding to the similar action text (S670). Then, the relay server 100 may transmit the command corresponding to the action to the service system 10 (S680). Accordingly, an action may be performed according to the command corresponding to the action in the service system 10.

In addition, the relay server 100 may determine whether the dialog has ended (S690). If the dialog is ended (S690-Y), the relay server 100 may interrupt the action. If the dialog is not ended (S690-N), the chatbot system 20 and the user may perform a dialog through the relay server 100 (S610).

Figure 7:
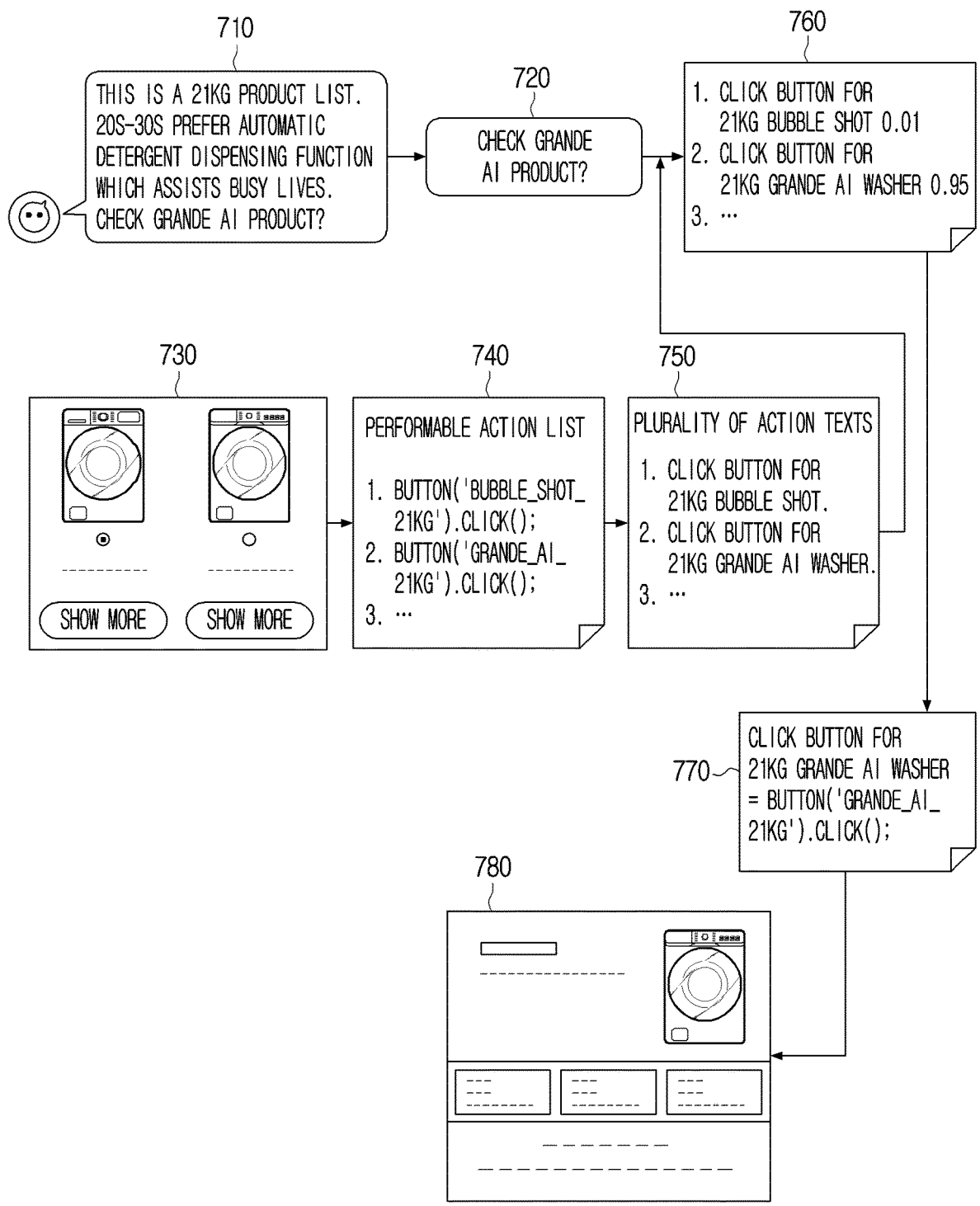
FIG. 7 is a diagram illustrating a specific embodiment of performing an action corresponding to an action text included in a second response text according to an embodiment.

FIG. 7 is a diagram illustrating a specific embodiment of performing an action corresponding to an action text included in a second response text according to an embodiment. Specifically, the embodiment of FIG. 7 is an embodiment of a user using the service system 100 providing a website service for selling a home appliance.

The user may perform a dialog with the chatbot system 20. At this time, the user and the chatbot system 20 may perform the dialog through the relay server 100.

The relay server 100 may obtain the second response text from the chatbot system 20. For example, the second response text (710) of "This is a 21 kg product list. 20s-30s prefer an automatic detergent dispensing function which assists busy lives. Check a Grande AI product?" may be obtained. Then, the chatbot system 20 may extract the text associated with the action performable by the service system 10. For example, the chatbot system 20 may obtain the action text (720) of "Check a Grande AI product?" in the second response text.

In addition, the relay server 100 may obtain information on the performable action list from the screen currently provided by the service system 10. For example, based on the currently provided screen being a web page screen (730) which provides product information on a washer of about 120 kg, the relay server 100 may obtain information on the action list (740) performable from the current web page screen (730) from the service system. At this time, in the information on the action list (740), "1. Button('Bubble_shot_21 kg').click( );, 2. Button('Grande_ai_21 kg').click( );, 3. . . ." may be included as information on the action of a plurality of items clickable from the current web page screen (730).

The relay server 100 may obtain the plurality of action texts corresponding to the respective actions included in the action list. For example, the relay server 100 may obtain "1. Click button for a 21 kg Bubble shot., 2. Click button for a 21 kg Grande AI washer., 3. . . ." as action texts (750) for the respective actions with respect to the plurality of items.

The relay server 100 may obtain the similarity (760) of the extracted action text with the respective action texts. For example, the relay server 100 may determine the similarity of the action texts "Check a Grande AI product?" and "Click button for a 21 kg Bubble shot." as 0.01, and the similarity of the action texts "Check a Grande AI product?" and "Click button for a 21 kg Grande washer." as 0.95.

The relay server 100 may identify the action text similar with the extracted action text from among the plurality of action texts based on similarity. For example, the relay server 100 may identify the action text "Click button for a 21 kg Grande washer." of which the similarity with the extracted action text from among the plurality of action texts is greater than or equal to a threshold value (e.g., 0.9) as the action text similar with the extracted action text.

The relay server 100 may identify the action corresponding to the identified action text, and select the command corresponding to the identified action. For example, the relay server 100 may obtain "Button('Grande_ai_21 kg').click( );" which is the command (770) corresponding to the identified action.

The relay server 100 may provide the obtained command to the service system 10, and the service system 10 may provide the corresponding web page screen (780) by performing "Click button for a 21 kg Grande washer" which is the action corresponding to the obtained command.

As described above, based on the relay server 100 automatically obtaining the command for the action included in the response by recognizing the response provided from the chatbot system 20 and providing the obtained command to the service system 10, the user may be provided with a service by recognizing the service system 10 and the chatbot system 20 acting as if using the same system.

Figure 8:
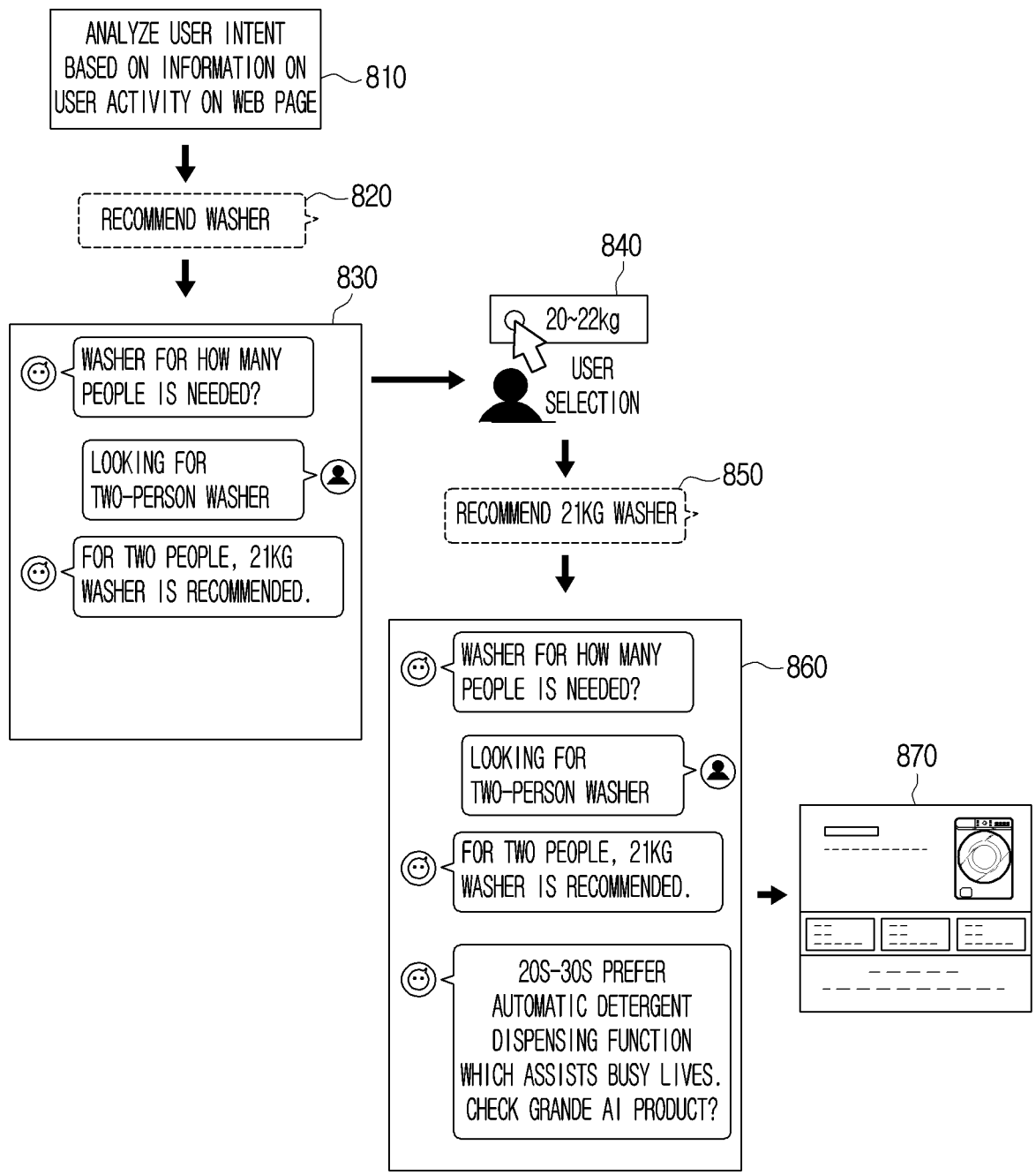
FIG. 8 is a diagram illustrating an embodiment of recommending a washer according to an embodiment.

FIG. 8 is a diagram illustrating an embodiment of recommending a washer according to an embodiment.

The relay server 100 may analyze the user intent based on the information on the activity of the user with respect to the web page (810). At this time, the information on the activity of the user may include the number of clicks of the web page on a washer product and information on time spent therein.

The relay server 100 may generate, with the method as described in FIGS. 2 to 5, the virtual question text of "recommend a washer" based on the user intent (820).

The chatbot system 20 may obtain the first response text of "a washer for how many people is needed?" as the response to the virtual question text and provide to the relay server 100, and the relay server 100 may provide the obtained first response text to the user terminal 30. Thereafter, the user may input the text "looking for a two-person washer," and as a response to thereof, the chatbot system 20 may provide the response text of "For two people, a 21 kg washer is recommended." The dialog process may be displayed in the chat window screen (830) of the user terminal 30. At this time, the "recommend a washer," which is the virtual question text, may not be displayed in the chat window screen of the user terminal 30.

Based on a user command being input in which the user selects an item of 20-22 kg (840), the relay server 100 may generate "recommend a 21 kg washer" which is the virtual question text (850) corresponding to the user intent, and provide the generated question text (850) to the chatbot system 20.

The chatbot system 20 may obtain the second response text of "20s-30s prefer an automatic detergent dispensing function which assists busy lives. Check a 21 kg Grande AI product?" as the response to the virtual question text and provide to the relay server 100. The dialog process may be displayed in the chat window screen (860) of the user terminal 30. At this time, the "recommend a 21 kg washer" which is the virtual question text may not be displayed in the chat window screen of the user terminal 30.

The relay server 100 may obtain the command corresponding to the action text included in the second response text based on the action text included in the second response text and the action list performable from the current screen with the method as described in FIGS. 6 and 7, and provide the obtained command to the service system 10.

The service system 10 may perform the action of displaying the web page screen (870) describing the Grande AI washer which is the corresponding action based on the obtained command.

Figure 9:
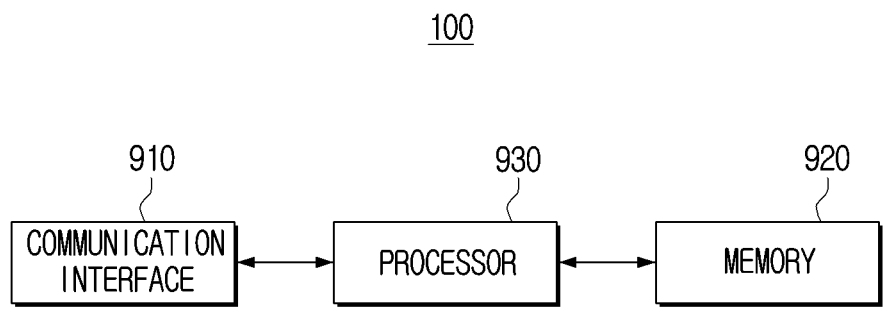
FIG. 9 is a block diagram including a configuration of a server according to an embodiment.

FIG. 9 is a block diagram including a configuration of a relay server according to an embodiment. The relay server 100 may include, as illustrated in FIG. 9, a communication interface 910, a memory 920, and a processor 930. However, the configuration illustrated in FIG. 9 is merely one embodiment, and another configuration may be added according to the type of the relay server 100.

The communication interface 910 may include circuitry, and may be configured to perform communication with an external device. Specifically, the processor 930 may be configured to receive various data or information from the external device connected through the communication interface 910, and transmit various data or information to the external device. The communication interface 910 may include at least one from among a WiFi module (not shown) and a wireless communication module. Specifically, the WiFi module may perform communication with a WiFi method. When using the WiFi module, various connection information such as a service set identifier (SSID) may be first transmitted and received, and various information may be transmitted and received after communicatively connecting using the same. In addition, the wireless communication module may be configured to perform communication according to various communication standards such as IEEE, Zigbee, 3rd Generation (3G), 3rd Generation Partnership Project (3GPP), Long Term Evolution (LTE), 5th Generation (5G), and the like.

Specifically, the communication interface 910 may receive the information on the user activity and the information on the currently performable actions from the service system 10, and transmit the command and the like corresponding to the action to the service system 10.

In addition, the communication interface 910 may transmit the question text to the chatbot system 20, and receive the first and second response texts from the chatbot system 20.

The memory 920 may be configured to store at least one instruction for controlling the relay server 100. Specifically, the memory 920 may be configured to store data necessary for performing various actions by a module which generates the virtual question text corresponding to the user intent and obtains the response text to the question text and a module which obtains commands based on the action text included in the response text. The module which generates the virtual question text corresponding to the user intent and obtains the response text to the question text may include the user intent determining module 110, the question generation module 120, the response analysis module 130, and the response providing module 140, and the module which obtains commands based on the action text included in the response text may include the action text generating module 150, the action text extracting module 160, the similarity determination module 170, the command selection module 180, and the like. In addition, the memory 920 may be configured to generate the virtual question text corresponding to the user intent and obtain the response text to the question text, and store a plurality of neural network models for obtaining the commands based on the action text included in the response text.

The memory 920 may include a non-volatile memory capable of maintaining the stored information even if power supply is interrupted and a volatile memory which requires a continuous power supply to maintain the stored information. The data which generates the virtual question text corresponding to the user intent and obtains the response text to the question text and the data which obtains the commands based on the action text included in the response text may be stored in the non-volatile memory. Further, the plurality of neural network models which generate the virtual question text corresponding to the user intent and obtain the response text to the question text, and obtain the commands based on the action text included in the response text may also be stored in the non-volatile memory.

The processor 930 may be electrically connected with the memory 920 and configured to control the overall function and action of the relay server 100.

The processor 930 may be configured to generate the virtual question text corresponding to the user intent stored in the non-volatile memory when the user request to access the service system 10 is received from the user terminal 30 and load data for the module obtaining the response text to the question text and the module obtaining commands based on the action text included in the response text to perform various actions in the volatile memory. Then, the processor 930 may be configured to generate the virtual question text corresponding to the user intent, obtain the response text to the question text, and load the plurality of neural network models for obtaining the commands in the volatile memory based on the action text included in the response text. The processor 930 may be configured to perform various actions through the various modules and neural network models based on the data loaded in the volatile memory. Here, the loading refers to an action of calling and storing the data stored in the non-volatile memory to the volatile memory so that it is accessible by the processor 930.

Specifically, the processor 930 may be configured to obtain the information on the activity of the user using the service system 10 by executing the at least one instruction stored in the memory 920, determine the user intent based on the information on the activity of the user, control the communication interface 910 to transmit the question text to the chatbot system 20 by obtaining the question text corresponding to the user intent based on the user intent, receive the first response text to the question text from the chatbot system 20 through the communication interface 910, identify whether to transmit the first response text to the user terminal 30 of the user based on the first response text, and control the communication interface 910 to transmit the first response text to the user terminal based on the identification.

Specifically, the processor 930 may be configured to identify whether the information on the response rejection is included in the first response text, and identify that the response text is not to be transmitted to the user terminal based on identifying that the information on the response rejection is included in the first response text. In addition, based on identifying that the information on the response rejection is included in the first response text, the processor 930 may be configured to obtain a re-question text corresponding to the user intent.

In addition, the processor 930 may be configured to receive the first response text registered in the virtual user session of the chatbot system 20 through the communication interface 910. Then, based on identifying that the first response text is to be transmitted to the user terminal of the user, the processor 930 may be configured to control the communication interface 910 to re-transmit the question text to the chatbot system, and receive the first response text registered in the actual user session of the chatbot system 20 through the communication interface 910. Then, the processor 930 may be configured to control the communication interface 910 to transmit the first response text to the user terminal 30. At this time, in the chat window screen displayed in the user terminal 30, the question text may not be displayed and the first response text may be displayed.

In addition, the processor 930 may be configured to control the communication interface 910 to receive the second response text from the chatbot system 20 through the communication interface 910, extract the text on the action performable by the service system 10 from the second response text, obtain information on the action list provided in the current screen by the service system 10, identify the action corresponding to the second response text based on the extracted action text and the information on the action list, and transmit the command for the identified action to the service system 10. At this time, the processor 930 may be configured to obtain the plurality of action texts corresponding to the plurality of actions included in the action list based on the obtained information on the action list, determine the similarity between the plurality of action texts and the extracted action text, obtain the action text of which the similarity with the extracted action text from among the plurality of action texts is greater than or equal to a threshold value, and identify the action corresponding to the action text of greater than or equal to the threshold value as the action corresponding to the second response text. For example, this may include determining a plurality of similarities between the plurality of action texts and the first action text followed by obtaining the second action text corresponding to a first similarity (corresponding to the first action text) among the plurality of similarities which is greater than or equal to the threshold value.

In the embodiment described above, the user terminal 30 and the relay server 100 have been described as separate devices, but this is merely one embodiment, and various configurations and functions of the relay server 100 may be implemented in the user terminal 100.

Functions associated with the neural network model as described above may be performed through the memory and the processor. The processor may be configured as one or a plurality of processors. At this time, the one or plurality of processors may be a generic-purpose processor such as a central processing unit (CPU) or an application processor (AP), a graphics dedicated processor such as a graphics processing unit (GPU) or a vision processing unit (VPU), or an artificial intelligence dedicated processor such as a neural processing unit (NPU). The one or plurality of processors may be configured to control so as to process input data according to a pre-defined operation rule or an artificial intelligence model stored in the non-volatile memory and the volatile memory. The pre-defined operation rule or the artificial intelligence model may be formed through learning.

The being created through learning may refer to a pre-defined operation rule or an artificial intelligence model of a desired characteristic being formed by applying a learning algorithm to multiple learning data. The learning may be carried out in the machine itself in which the artificial intelligence according to the disclosure is performed, or carried out through a separate server/system.

The artificial intelligence model may include a plurality of neural network layers. The respective layer may include a plurality of weight values, and perform processing of the layers through processing the processing results of a previous layer and the plurality of weight values. Examples of the neural network may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), and a Deep-Q Networks, and the neural network of the disclosure is not limited to the above-described examples, unless otherwise specified.

The learning algorithm may be a method for a predetermined target machine to make decisions or predictions on its own by using multiple learning data to train the predetermined target machine (e.g., robot). Examples of the learning algorithm may include supervised learning, unsupervised learning, semi-supervised learning, or reinforcement learning, and the learning algorithm of the disclosure is not limited to the above-described examples unless otherwise specified.

The machine-readable storage medium may be provided in the form of a non-transitory storage medium. Here, 'non-transitory' merely means that the storage medium is tangible and does not include a signal (e.g., electromagnetic wave), and that the term does not differentiate data being semi-permanently stored or being temporarily stored in the storage medium. For example, the 'non-transitory storage medium' may include a buffer in which data is temporarily stored.

According to an embodiment, a method according to the various embodiments disclosed above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online (e.g., downloaded or uploaded) through an application store (e.g., PLAYSTORE™) or directly between two user devices (e.g., smartphones). In the case of online distribution, at least a portion of the computer program product (e.g., downloadable app) may be at least stored temporarily in a storage medium such as a server of a manufacturer, a server of an application store, or a memory of a relay server, or temporarily generated.

Each of the elements (e.g., a module or a program) according to various embodiments of the disclosure as described above may be formed as a single entity or a plurality of entities, and some sub-elements of the above-mentioned sub-elements may be omitted, or different sub-elements may be further included in the various embodiments. Alternatively or additionally, some elements (e.g., modules or programs) may be integrated into one entity to perform the same or similar functions performed by the respective elements prior to integration.

Operations performed by a module, a program, or another element, in accordance with various embodiments, may be performed sequentially, in a parallel, repetitively, or in a heuristic manner, or at least some operations may be executed in a different order, omitted or a different operation may be added.

The term "part" or "module" used in the disclosure may include a unit configured as a hardware, software, or firmware, and may be used interchangeably with terms such as, for example, and without limitation, logic, logic blocks, components, circuits, or the like. "Part" or "module" may be a component integrally formed or a minimum unit or a part of the component performing one or more functions. For example, a module may be configured as an application-specific integrated circuit (ASIC).

The various embodiments may be implemented with software including instructions stored in a machine-readable storage media (e.g., computer). The machine may call an instruction stored in the storage medium, and as a device capable of operating according to the called instruction, may include the electronic device (e.g., electronic device 100) according to the embodiments described.

Based on the instruction being executed by the processor, the processor may directly or using other elements under the control of the processor perform a function corresponding to the instruction. The instruction may include a code generated by a compiler or executed by an interpreter.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A method for controlling a server, the method comprising:
obtaining an activity information on an activity of a user, wherein the user is using a service system;
determining a user intent based on the activity information;
obtaining a question text corresponding to the user intent based on the user intent;
transmitting the question text to a chatbot system;
receiving, from the chatbot system in response to the question text, a first response text;

determining, based on the first response text, whether to transmit the first response text to a user terminal of the user;

transmitting the first response text to the user terminal based on the determining;

receiving a second response text from the chatbot system;

extracting a first action text on a performable action by the service system from the second response text;

obtaining list information of an action list provided in a current screen by the service system;

identifying an action corresponding to the second response text based on the first action text and the information on the action list;

obtaining a second action text of which a first similarity from among a plurality of similarities is greater than or equal to a threshold value; and wherein the identifying the action further comprises identifying the action corresponding to the second action text of greater than or equal to the threshold value as the action corresponding to the second response text; and transmitting a command for the action to the service system.

2. The method of claim 1, wherein the determining whether to transmit comprises identifying whether information of a response rejection is comprised in the first response text, and identifying that the first response text is not to be transmitted to the user terminal based on the response rejection being comprised in the first response text.

3. The method of claim 2, comprising obtaining, based on the response rejection being comprised in the first response text, a re-question text corresponding to the user intent.

4. The method of claim 1, wherein the receiving comprises receiving the first response text registered in a virtual user session of the chatbot system, and wherein the transmitting the first response text comprises:

re-transmitting, based on the determining that the first response text is to be transmitted, the question text to the chatbot system;

receiving the first response text, wherein the first response text is registered in a user session of the chatbot system; and transmitting the first response text to the user terminal.

5. The method of claim 4 wherein, in a chat window screen displayed on the user terminal, the question text is not displayed and the first response text is displayed.

6. The method of claim 1, wherein the activity information comprises at least one from among screen information on a service screen currently displayed, click information on an item clicked by the user, content information on content input by the user, and time information on time in which the service screen is displayed.

7. The method of claim 1, wherein the identifying the action corresponding to the second response text comprises:

obtaining, based on the list information, a plurality of action texts corresponding to a plurality of actions comprised in the action list;

determining the plurality of similarities between the plurality of action texts and the first action text.

8. The method of claim 1, wherein the question text is provided to a natural language understanding module of the chatbot system.

9. The method of claim 1, wherein the first response text is received from a dialog manager of the chatbot system.

10. The method of claim 9, wherein the second response text is received from the dialog manager.

11. The method of claim 1, wherein the transmitting the command comprises transmitting the command to a service control module of the service system.

12. The method of claim 1, wherein the method is performed by a relay server.

13. A server, comprising:

a communication interface;

a memory comprising at least one instruction; and a processor configured to control the server by being connected with the communication interface and the memory, wherein the processor is further configured to:

obtain, by executing the at least one instruction, activity information of an activity of a user using a service system, determine a user intent based on the activity information, control the communication interface to transmit a question text to a chatbot system by obtaining the question text corresponding to the user intent based on the user intent, receive a first response text to the question text from the chatbot system through the communication interface, determine whether to transmit the first response text to a user terminal of the user based on the first response text, control the communication interface to transmit the first response text to the user terminal based on the determination, receive a second response text from the chatbot system;

extract a first action text on a performable action by the service system from the second response text;

obtain list information of an action list provided in a current screen by the service system;

identify an action corresponding to the second response text based on the first action text and the information on the action list;

obtain a second action text of which a first similarity from among a plurality of similarities is greater than or equal to a threshold value; and wherein the identify the action further comprises identifying the action corresponding to the second action text of greater than or equal to the threshold value as the action corresponding to the second response text; and control the communication interface to transmit a command for the action to the service system.

14. The server of claim 13, wherein the processor is further configured to identify whether rejection information on a response rejection is comprised in the first response text, and identify that the first response text is not to be transmitted to the user terminal based on identifying that the rejection information is comprised in the first response text.

15. The server of claim 14, wherein the processor is further configured to obtain, based on identifying that the rejection information is comprised in the first response text, a re-question text corresponding to the user intent.

16. The server of claim 13, wherein the processor is further configured to:

receive the first response text registered in a virtual user session of the chatbot system through the communication interface, control, based on identifying that the first response text is to be transmitted to the user terminal of the user, the communication interface to re-transmit the question text to the chatbot system, receive the first response text registered in an actual user session of the chatbot system through the communication interface, and control the communication interface to transmit the first response text to the user terminal.

17. The server of claim 16 wherein, in a chat window screen displayed in the user terminal, the question text is not displayed and the first response text is displayed.

18. The server of claim 13, wherein the activity information comprises at least one from among screen information on a service screen currently displayed, click information of an item clicked by the user, content information on content input by the user, and time information on time in which the service screen is displayed.

\* \* \* \* \*